US006937347B2

(12) United States Patent
Erwin (10) Patent No.: US 6,937,347 B2
(45) Date of Patent: Aug. 30, 2005

(54) SMALL-BEAM LATERAL-SHEAR INTERFEROMETER (75) Inventor: J. Kevin Erwin, Tucson, AZ (US)

(73) Assignee: Engineering Synthesis Design Inc., Tucson, AZ (US)

( * ) Notice: Subject to any disclaimer, the term of this patent is extended or adjusted under 35 U.S.C. 154(b) by 492 days.

(21) Appl. No.: 10/245,923

(22) Filed: Sep. 18, 2002

(65) Prior Publication Data

US 2004/0051877 A1 Mar. 18, 2004

(51) Int. Cl.[7] .................................................. G01B 9/02
(52) U.S. Cl. ....................................................... 356/520
(58) Field of Search ......................................... 356/520

(56) References Cited

U.S. PATENT DOCUMENTS

| | | | | |
|---|---|---|---|---|
| 4,953,981 A | * | 9/1990 | Hales | 356/520 |
| 5,355,218 A | * | 10/1994 | Matsuda et al. | 356/520 |
| 5,543,916 A | * | 8/1996 | Kachanov | 356/451 |
| 5,923,452 A | * | 7/1999 | Carlson | 398/123 |

OTHER PUBLICATIONS

Mantravadi, M. V., Chapter 4 of Optical Shop Testing, John Wiley & Sons, Inc., Second Edition (1992), pp. 123–169.
Melles Griot Catalog, p. 47.12.

* cited by examiner

Primary Examiner—Gregory J. Toatley, Jr.
Assistant Examiner—Michael A. Lyons
(74) Attorney, Agent, or Firm—Antonio R. Durando; Quarles & Brady Streich Lang, LLP (57) ABSTRACT

A lateral-shear interferometer utilizes two relatively thick glass plates bonded together in a single block with a tilted air gap between opposing inner surfaces. The thickness of the glass plates is selected to be sufficiently large to separate the output beams from the light reflected from the top and bottom surfaces of the block, thereby eliminating the need for antireflection coatings. The shear interferometer is combined with an external mirror mounted on a tilt stage actuated by a computer-controlled tilt actuator to perform phase-shifting interferometric analysis in conventional manner.

18 Claims, 7 Drawing Sheets

SMALL-BEAM LATERAL-SHEAR INTERFEROMETER

BACKGROUND OF THE INVENTION

1. Field of the Invention

This invention is related in general to the field of interferometry and, in particular, to an improved approach for testing small light beams by lateral-shear interferometry.

2. Description of the Related Art

Lateral-shear interferometry is known in the art as a method of testing optical components, including the testing of collimation of light beams. The method consists of displacing a wavefront laterally by a small amount and obtaining an interference pattern between the original and the displaced wavefronts. A simple and common physical arrangement to obtain lateral shear consists of two plane glass surfaces used as beam dividers and by the introduction of a small tilt between the surfaces.

Figure 1:
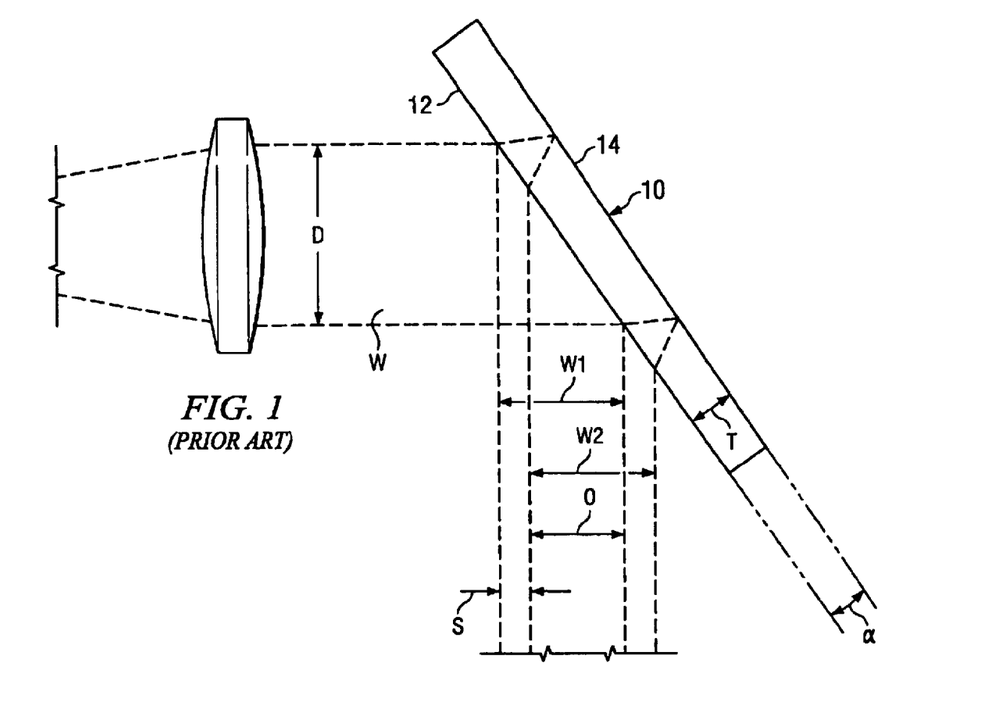
FIG. 1 is a schematic illustration of a prior-art single-plate lateral-shear interferometer.

Such devices are commercially known as shear-plate interferometers. As shown in FIG. 1, a thin glass plate 10 is positioned at approximately 45-degree angle to an incident light beam W of predetermined width or diameter D produced by a source (not shown), such as a laser. Because of the reflectivity of the front and back surfaces 12, 14 of the plate 10, two wavefronts W1, W2 result from a single incident beam W. As illustrated in the figure, the wavefront W1 reflected from the front surface 12 is displaced from the wavefront W2 reflected from the back surface 14 by a lateral shear S. As a result, the two reflected beams overlap over a common region of overlap O. The size of the overlap O depends on the width D of the beam W relative to the thickness T of the plate 10. As one skilled in the art would readily understand, the shear plate 10 must be progressively thinner as the beam W is reduced in size in order to ensure that a zone of overlap exists.

Figure 2:
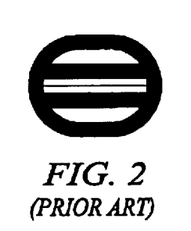
FIG. 2 illustrates the typical image of parallel interferometric fringes produced by a perfectly collimated, aberration-free, light beam tested with a conventional shear interferometer.
Figure 3:
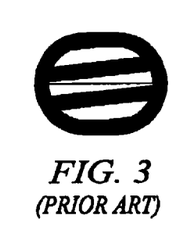
FIG. 3 illustrates the typical image of parallel interferometric fringes produced by a converging light beam tested with a conventional shear interferometer.
Figure 4:
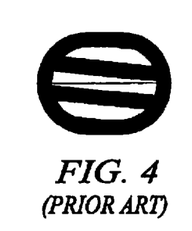
FIG. 4 illustrates the typical image of parallel interferometric fringes produced by a diverging light beam tested with a conventional shear interferometer.

By introducing a small angle between the front and back surfaces 12,14 (illustrated in exaggerated proportion by the angle α in FIG. 1), interference is produced between the two reflected wavefronts W1 and W2 in the region of overlap O. Thus, this simple optical device can be used to analyze the quality of the beam W, or the quality of optical elements in the path of the collimated wavefront. For example, a perfectly collimated, aberration-free, wavefront incident to the plate 10 produces a pattern of parallel fringes, as illustrated in FIG. 2, oriented in the direction normal to the direction of shear. Predictably, converging and diverging wavefronts produce clockwise and counterclockwise rotation of the parallel fringes, respectively, as shown in FIGS. 3 and 4. Other fringe patterns identify other optical aberrations in the tested beam of light (whether the result of light-source or lens imperfections), such as spherical aberration, coma, astigmatism, curvature of field, and chromatic aberration. Thus, the fringe pattern produced by the shear interferometer 10 is advantageously utilized to produce a detailed analysis of the quality of the incoming wavefront W. See Chapter 4 of Optical Shop Testing, John Wiley & Sons, Inc., Second Edition (1992), for details about the theory underlying lateral-shearing interferometers.

A disadvantage of this type of lateral-shear interferometer resides in the fact that the reflected images will not overlap if the beam W is too small relative to the thickness T of the plate 10. Therefore, the thickness of the glass plate limits how small the beam W can be. For example, lateral-shear interference on beam sizes less than 5 mm in diameter requires a thickness T of about 1 mm or less. In practice, it is very difficult to manufacture a glass plate less than a few millimeters thick with very precise flat surfaces and a shear wedge therebetween. Thus, conventional lateral-shear interferometers are not suitable for testing beams less than about 5–8 mm in diameter.

Figure 5:
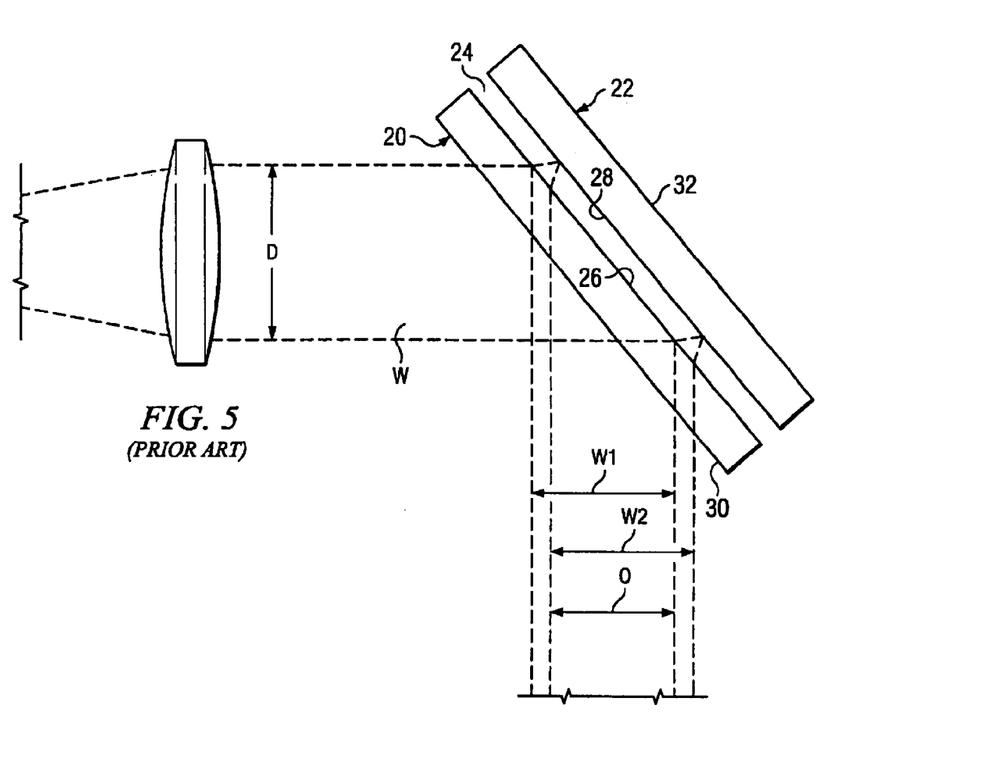
FIG. 5 is a schematic representation of a conventional two-plate lateral-shear interferometer.

As illustrated in FIG. 5, one solution to this problem has been to use two glass plates 20,22 separated by an air gap 24, which can easily be manufactured as small as needed in the form of a wedge, instead of a single thin plate. The inside surfaces 26 and 28 of the plates 20 and 22, respectively, are uncoated, so that about 4% of the incoming light is reflected by them (simply based on the reflectivity of untreated glass). The outer surfaces 30 and 32 are coated with a high-quality antireflection coating, so that the intensity of light reflected from these surfaces is reduced as much as possible in order to decrease interference with the reflected wavefronts W1,W2.

Although this design of lateral-shear interferometer is advantageously suitable for small-beam applications, it suffers from several drawbacks that disadvantage its commercial utilization. Because antireflection coatings are not perfect and cannot work over a broad range of wavelengths, the resulting fringe image retains unwanted interference patterns due to reflections from the treated surfaces (30,32). Moreover, antireflection coatings are quite expensive, particularly the highly efficient coatings required for lateral-shear interferometry. Therefore, the cost of these devices is relatively high. Because the two glass plates are mounted on a connecting frame, they are subject to relative movement due to mechanical stresses and environmental effects on the frame that render the reflective surfaces unstable over time. In addition, conventional lateral-shear interferometers have not been coupled to image magnification optics, thereby making analysis of small beams impractical. Finally, conventional shear-interferometer designs produce diffraction rings from the edges of the wavefront under test, which causes serious problems of image degradation when testing small beams. Therefore, there is still a need for an improved lateral-shear interferometer that addresses these problems.

BRIEF SUMMARY OF THE INVENTION

One primary objective of this invention is a lateral-shear interferometer that is suitable for testing small light beams, particularly beams smaller than about 8 mm in diameter.

Another important goal of the invention is a two-plate shear interferometer that prevents interference from unwanted reflections without the use of antireflective coatings.

Another objective of the invention is a lateral-shear interferometer with a two-plate configuration of monolythic construction, so as to reduce performance variations due to mechanical stresses and environmental effects.

Still another objective is a device that includes magnification of the fringe image produced by the interference of the sheared wavefronts.

Another goal is a device that includes means for eliminating diffraction rings in the fringe image produced by the interferometer.

Another objective is a device adapted for use with a wider range of wavelengths than is possible with conventional shear interferometers.

Therefore, according to these and other objectives, the preferred embodiment of the present invention consists of a lateral-shear interferometer wherein two relatively thick glass plates are bonded together in a single block with an air gap between the opposing inner surfaces sufficient to cause a lateral displacement between beams reflected thereby. A tilt is introduced between the inner plate surfaces as required to produce preferably about 3½ interference fringes in the overlap region of the two beams. According to one aspect of the invention, the thickness of the glass plates is selected to be sufficiently large to separate the overlapping test beams from the light reflected from the top and bottom surfaces of the block, thereby eliminating the need for antireflection coatings. As the incoming beam enters the uncoated glass plates, about four percent of the light is reflected from all four surfaces of the two-plate block, but the lateral displacement produced by the thickness of the plates completely separates the beams reflected from the inner surfaces from those reflected from the outer surfaces, thereby avoiding all interference between them and the overlapping beams as a result of design, rather than the use of expensive coatings. In order to eliminate diffraction ring effects, the incoming light beam is directed to the shear interferometer through an aperture and the image of the aperture is relayed by optics onto a screen or camera.

According to another aspect of the invention, the shear interferometer is combined with an external mirror mounted on a tilt stage actuated by a computer-controlled tilt actuator. It was discovered that changes in the angle of the mirror in the plane defined by the input and output beams of the interferometer causes changes in the optical path difference of the two reflected beams. Thus, by changing the angle of tilt of the mirror, phase-shifted fringes are produced at the output of the interferometer. Accordingly, interferometric analysis can be carried out in conventional manner by recording a sequence of consecutive intensity frames as the mirror's angle is changed.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

One aspect of the present invention lies in the recognition that the interference problems arising from the reflection produced by the outer surfaces of conventional dual-plate lateral-shear interferometers can be essentially eliminated simply by increasing the thickness of each plate. The invention further lies in the discovery that the combination of a lateral-shear interferometer with a tilting reflective surface in the optical path of the incoming beam can be used advantageously to produce phase shifts in the pattern of interferometric fringes observed at the output of the device. Thus, the lateral-shear interferometer of the invention, in addition to its simpler process of manufacture, can also be used as an alternative to much more complicated and expensive prior-art devices to carry out phase-shifting interferometry.

As used herein, the terms "two-plate" and "dual-plate" are used interchangeably to refer to lateral-shear interferometers wherein the beam displacement is obtained by an air wedge formed between two separate glass-plate components coupled to construct a unitary block. The term "beam-splitting," such as in beam-splitting plate, is used to indicate an optical structure that exhibits both transmittance and reflectance. The terms "output beam" and "output wavefront" refer to each of the two overlapping beams of interest for measurement purposes, as distinguished from wavefronts reflected from the front and back surfaces of the two-plate shear interferometer of the invention. Finally, the term "monolithic" is intended to mean consisting of or constituting a single unit, even though the unit may result from combining and bonding together distinct components.

The term "thick," as it relates to the thickness of each of the plates constituting the two-plate block of the invention, is defined for the purposes of this invention as the thickness required to avoid overlap of the output wavefronts with the wavefronts reflected from the outer front and back surfaces of the plates. A thickness T greater than the product of the diameter D of the incident beam W times the ratio $\sin \beta / \sin 2\beta$, where $\beta$ is the angle of incidence to the lateral shear interferometer, will ensure this condition between media of equal refractive index. Since in practice the angle of incidence is typically chosen to be about $\pi/2$, in such case the relation reduces to T being greater than about 0.707D. As one skilled in the art would readily recognize, though, the difference in refraction between air and glass (or other suitable beam-slitting media) in not insignificant. Thus, refraction effects in practice contract the spacing between the wavefront reflected from the front surface and the output wavefronts, as well as the spacing between the wavefront reflected from the front surface and the wavefront reflected from the back surface. Therefore, this theoretical relation provides insufficient thickness for the purposes of the invention. A thickness at least greater than about 1.13D has been found to be suitable for glass-plate applications.

Figure 6:
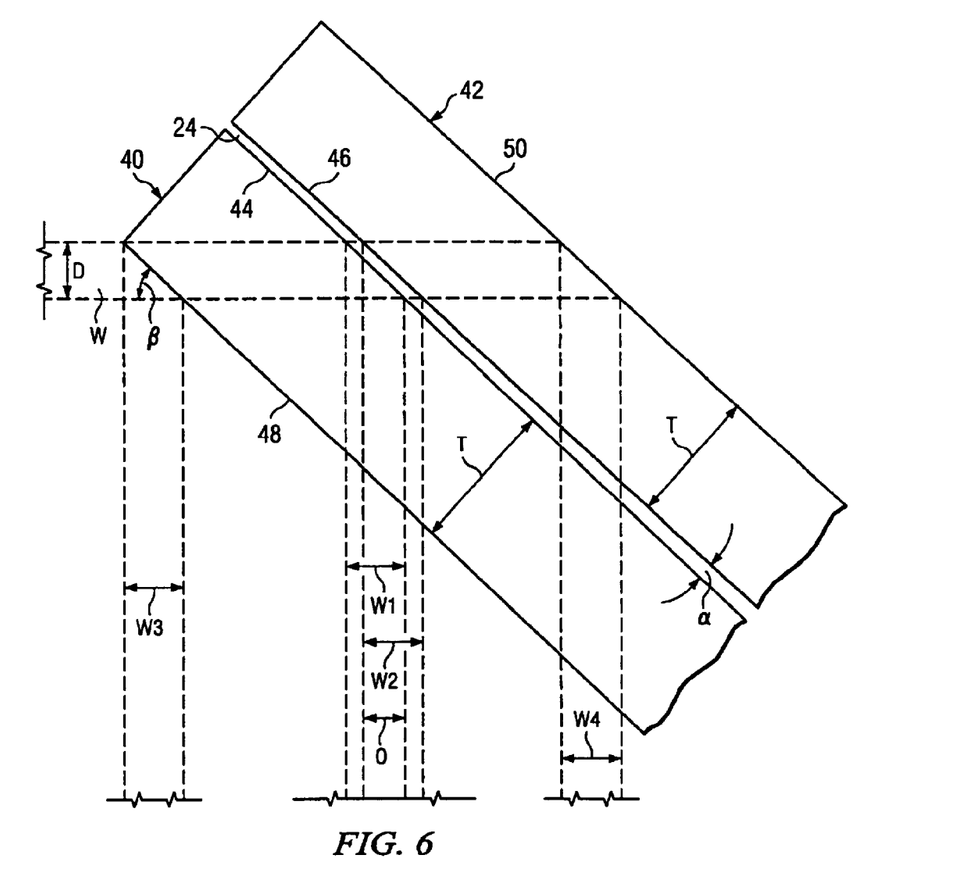
FIG. 6 is a schematic representation of a thick-plate dual-plate lateral-shear interferometer according to the present invention.

Referring to the drawings, wherein like parts are designated throughout with like numerals and symbols, FIG. 6 illustrates schematically the advantages provided by the use of thick plates relative to the size of the measurement beam. According to the invention, front and back beam-splitting plates 40 and 42, respectively, are selected with a thickness T (which may be the same or different) that must be larger than the diameter D of the incoming beam W, as disclosed. The plates 40,42 are preferably made of fuse silica, but other beam-splitting materials such as generic glass, silicon, sapphire, calcium fluoride, zinc sulfide, germanium, and plastics (different materials may be best suitable for different wavelengths of operation), would be equivalently suitable to practice the invention. The beam W is sheared in conventional manner by the inner surfaces 44 and 46 of the front and back plates 40 and 42, respectively, producing reflected beams W1 and W2 with a region of overlap O. As shown in FIG. 6, the thickness of the front plate 40 produces a substantial lateral displacement of the beam W3 reflected from the front surface 48 of the front plate, so as to avoid any possibility of interference between W3 and the output beams. Similarly, the thickness of the back plate 42 produces a substantial lateral displacement of the beam W4 reflected from the back surface 50 of the back, thereby avoiding interference between W4 and the output beams.

Figure 7:
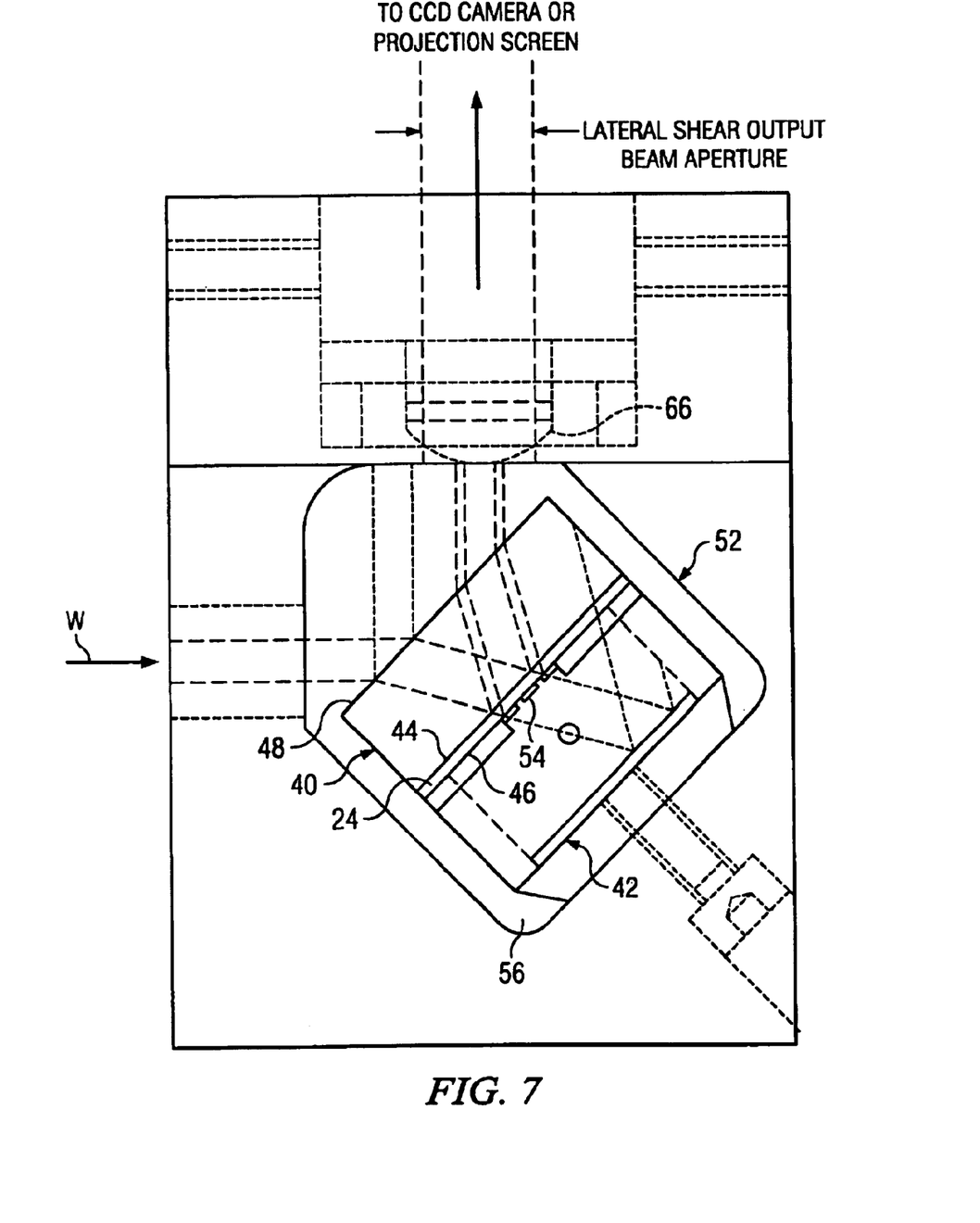
FIG. 7 is a schematic representation of a monolithic embodiment of a dual-plate shear interferometer according to the invention.

This concept of the invention may be implemented in practice in a monolithic block 52 as illustrated schematically in FIG. 7. The block 52 consists of a front plate 40 rigidly bonded to a back plate 42. The inner surfaces 44,46 of the two plates define an air gap 24 (wedge) approximately 1 mm wide with an angle α selected to provide an adequate number of interference fringes within the region of overlap O under observation. Width and tilt parameters that produce about 3½ fringes are suitable for measuring test beams. This number of fringes is convenient for measurement purposes, allowing easy interpretation of aberrations in the beam. Accordingly, it is generally preferred, but the number of fringes must be optimized during manufacture for a particular beam size and wavelength. Plates 40,42 having a thickness T of at least 9.5 mm have been used successfully with a 632-nm wavelength light source (He—Ne) to measure beams with diameters varying from less than 0.5 mm to about 8 mm.

The block 52 is constructed for a particular application by manipulating the relative position of the plates 40 and 42 while testing a beam W of known characteristics to vary the gap 24 and angle α so as to produce the desired number of interference fringes. Once that is achieved, the two plates are bonded together (such as by epoxy) to form a monolithic unit using three peripheral pads 54 in the frame 56 holding the plates in place. The block 52 is bonded to the frame 56, which is preferably made of Invar® material, known for having a coefficient of thermal expansion close to that of fuse-silica glass, thereby further consolidating the integral structure of the lateral-shear interferometer of the invention. This special Invar mount design allows permanent, highly stable mounting of glass plates. In addition, it is cost-effective in the process of custom optimization of required wedge angles and spacings for any wavelength or beam size less than about 8 mm in diameter. The air gap 24 may be set using shim stock, any gap 1 mm or less being suitable for small beams. The desired tilt between the plates 40,42 may be obtained by lapping the three peripheral pads 54 on the top of the Invar mount.

Figure 8:
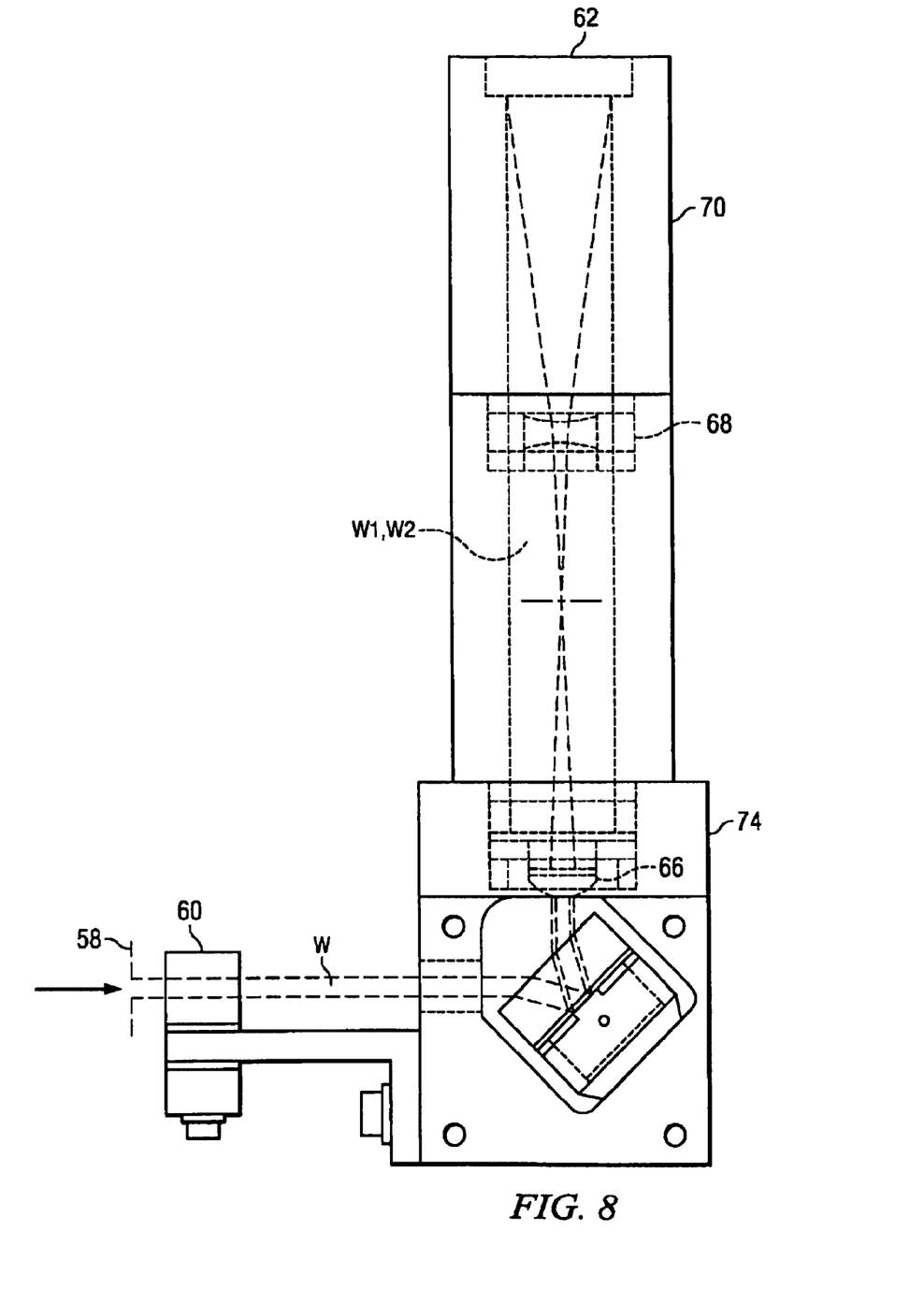
FIG. 8 is a schematic representation of the preferred embodiment of the invention wherein the fringe pattern produced by the lateral-shear interferometer is projected on a screen with the aperture edge in focus.
Figure 9:
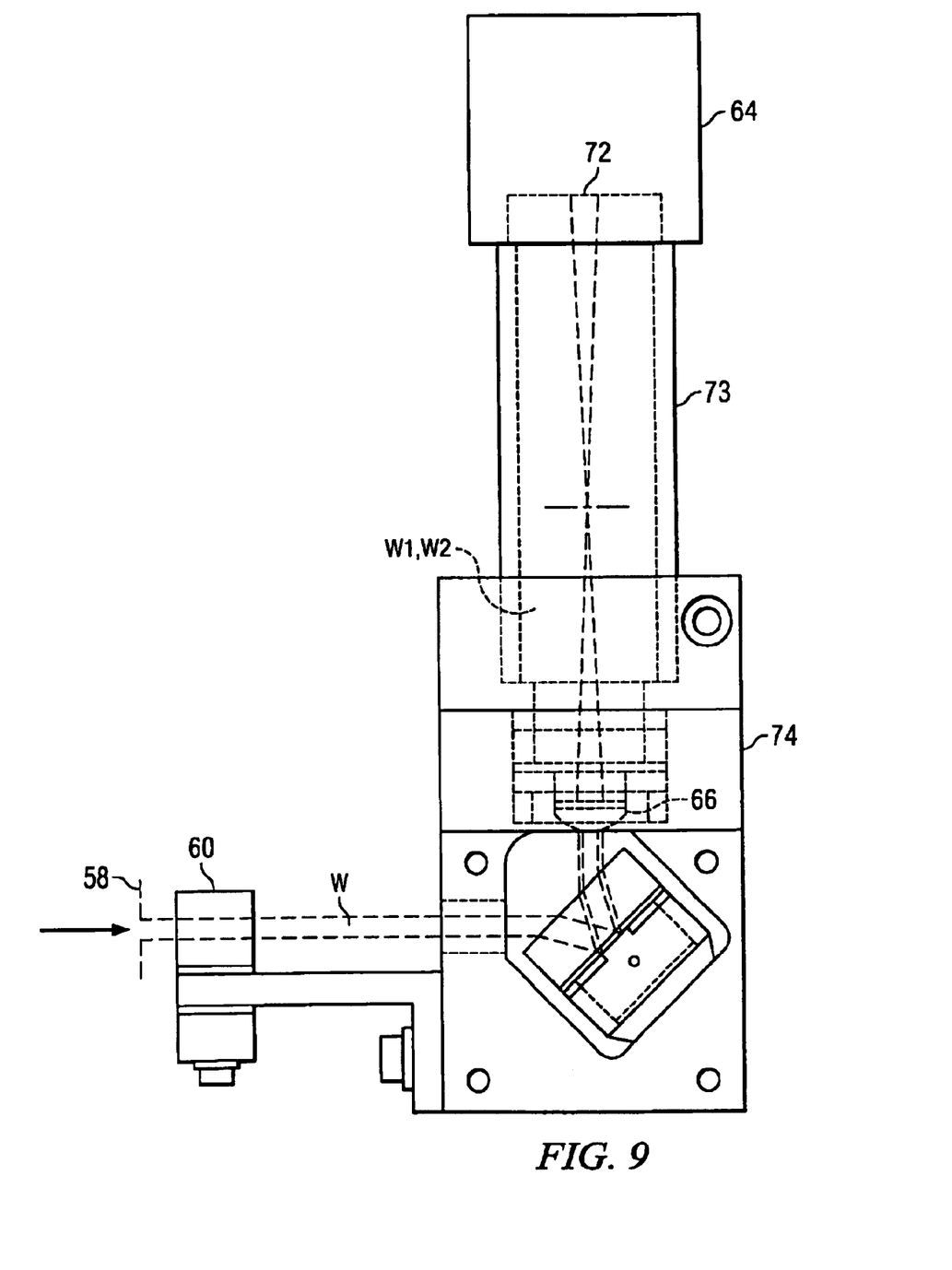
FIG. 9 is a schematic representation of the preferred embodiment of the invention wherein the fringe pattern produced by the lateral-shear interferometer is projected on a CCD-array camera with the aperture edge in focus.

The lateral-shear interferometer of the invention has been implemented in two embodiments, using a visual projection screen, illustrated in FIG. 8, and using a CCD camera, illustrated in FIG. 9. In the visual projection-screen version, the incoming beam of a laser W is directed at an aperture 58 near the front of an adjustable beam-splitter cube 60 used to test beams coming from two orthogonal directions. The image of the aperture 58 is relayed by optics onto a screen 62 or camera 64 to eliminate diffraction-ring effects. The cube 60 serves as a convenient way to access the test beam in an optical setup, but it is not essential to the operation of the invention.

A positive lens 66 with a focal length of about 2 inches is preferably used in both embodiments and serves to simultaneously relay the image of the pupil and magnify or minify the beam image size for viewing on the projection screen 62 or CCD-array camera 64. As a result of this optical arrangement, the image of the pupil's edge remains in sharp focus, avoiding the degradation of the fringe image that otherwise diffraction rings from the edge of this aperture would cause, especially with small test beams. Whether the test beam W should be magnified or minified depends on the CCD-array size (or projection screen size) and the beam size. As one skilled in the art would know, optimal magnification results in maximum visibility of the wavefront in the screen or camera without overfilling the field of view.

Figure 10:
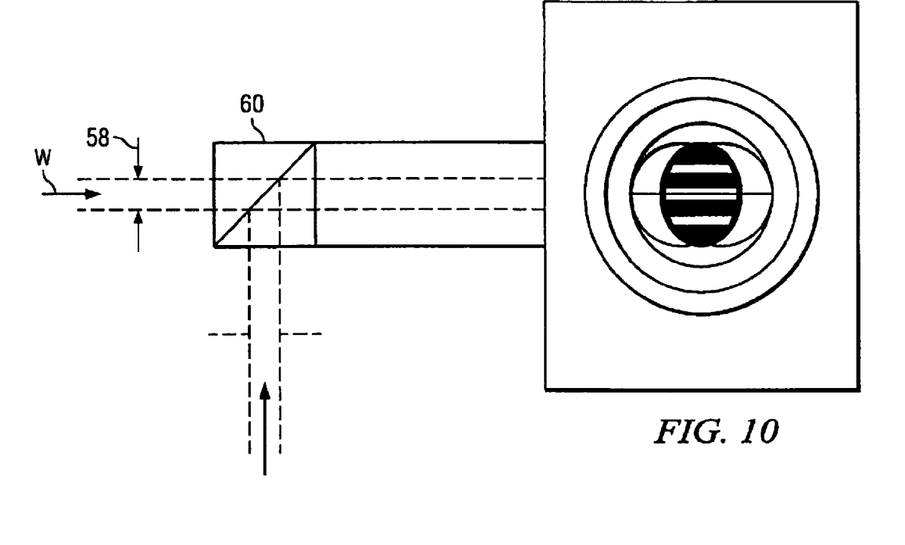
FIG. 10 is a top view of the embodiment of FIG. 8 illustrating the fringe pattern produced by a collimated beam as seen through a translucent visual-projection screen.

In the projection-screen embodiment of FIG. 8, the output wavefronts W1,W2 focus to a point 2 inches from the positive lens 66 and then diverge through a short focal-length negative lens 68, which further magnifies the wavefronts and projects them onto a translucent screen 62. The fringes are preferably viewed from the top of the screen assembly 70, as illustrated in FIG. 10. The projection screen 62 may consist of ground glass, or a translucent material that fluoresces in the UV or IR wavelength. Very thin coatings of fluorescent paint on glass have been successfully tried for use in the UV range of wavelength. The screen 62 is preferably placed such that the image of the edge of the aperture 58 is in focus on the screen.

It is noted that in this design the positive lens 66 does not provide sufficient magnification for visual projection, and is used mainly to relay the aperture image; so, the short focal-length negative lens 68 provides most of the magnification. Using the combination of positive and negative lenses, the relayed focused image of the beam aperture 58 remains sharp, with minimal or no diffraction rings past the negative lens 68, regardless of the distance of the projection screen 62 relative to the negative lens. The distance between the positive and negative lenses is optimized such that the relayed image of the beam aperture is in focus on the projection screen when the aperture 58 is placed at a desired location in front of the beam splitter cube 60.

In the CCD-camera embodiment of FIG. 9, the output beams W1,W2 focus to a point 2 inches from the positive lens and then diverge. The CCD array 72 of the camera 64 is placed after the focus position. The size of the projected image is determined by the distance between the CCD array and the lens focal point. Thus, the required length of the camera extension tube 73 depends on the size of the CCD array, the size of the beam, and the desired location of the incoming beam aperture 58 in front of the cube 60. The relay distance can be calculated in conventional manner using the lensmaker's equation such that the image of the edge of the aperture 58 is in focus on the CCD array. As in the projection screen embodiment of the invention, the CCD array may be coated with a translucent material that fluoresces in the UV or IR wavelength.

It is noted that in both embodiments reflections from the front surface 48 of the front glass plate 40 and the back surface 50 of the back glass plate 42 are blocked from view by the mounting structure 74 of the lens 66 because of the lateral displacement effected by the thick shearing plates of the invention. Therefore, no antireflection coating is necessary to prevent interference from these reflected wavefronts.

Figure 11:
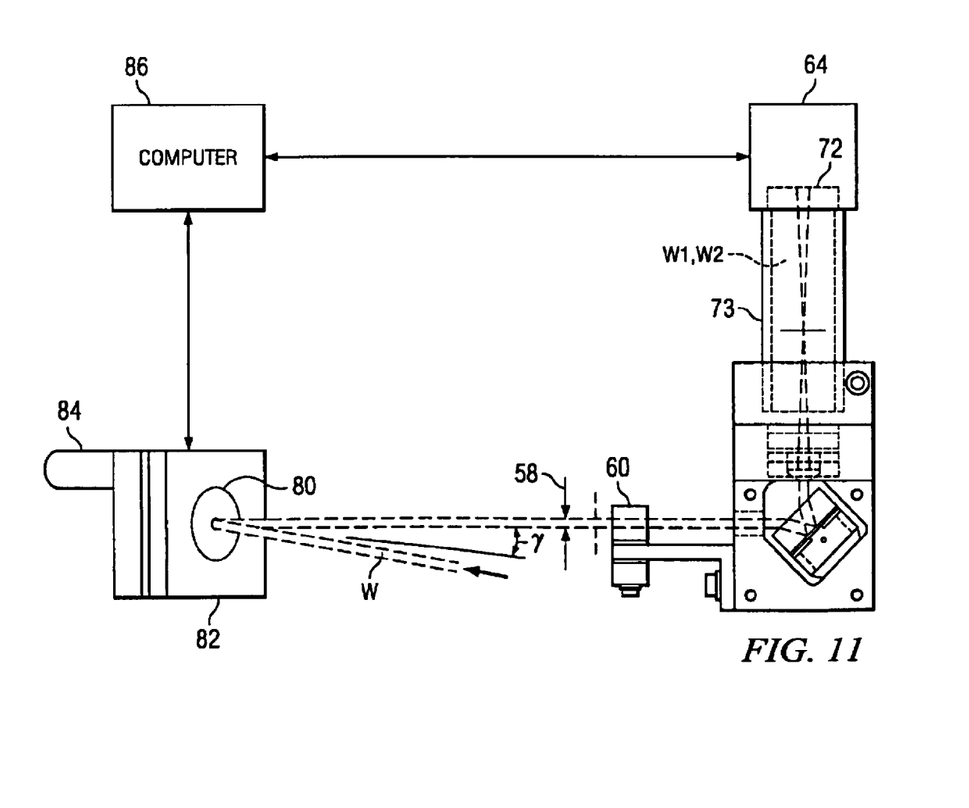
FIG. 11 is another embodiment of the invention wherein the lateral-shear interferometer is combined with a variable-tilt mirror to perform phase-shifting analysis of the test beam.

According to another aspect of the invention, illustrated in FIG. 11 with reference to the embodiment of FIG. 9, the disclosed lateral-shear interferometer is combined with a tilting mirror 80 placed in the optical path of the beam W. The incoming beam to the aperture 58 is reflected and tilted by the mirror 80 from its source (not shown) along an optical path in a vertical plane (that is, the plane defined by the path of the incoming beam W and the output beams W1,W2—tilt in the horizontal plane has been found to have very little effect on phase shift). The mirror 80 is mounted on a tilting stage 82 at an angle that is variably controlled by a tilt actuator (angular scanner) 84 connected to a computer 86. Experiments have shown that varying the angle of incidence (and reflection) γ of the beam W to the mirror 80 so as to cause an angular shift of the reflected beam in the plane defined by the input and output beams of the interferometer produces phase shifts in the fringe image at the output of the interferometer. Accordingly, the invention can be used advantageously also to perform phase-shifting measurements in a conventional manner. This feature is highly desirable for many applications because it enables quantitative computer analysis of the wavefront being tested that are not possible simply by observing fringes produced by lateral-shear interferometry.

As is well understood in the art, phase shifting is accomplished by changing the difference in the path lengths of the two reflected beams W1,W2. This can be achieved, for instance, by mounting the back glass plate 42 (FIG. 7) on a PZT actuator under computer control to increase or decrease the distance between the plates, thereby changing the optical path difference (OPD) between reflected wavefronts. Equivalent results can be obtained by varying the angle γ, which is easily achieved simply by changing the tilt of the mirror 80. Accordingly, sequential intensity frames of the interference fringes produced by the interferometer are recorded by the camera 64 as the mirror 80 is tilted by known step amounts in an angular scan equivalent to the linear scan of conventional interferometry. Phase-shifting analysis can then be performed with conventional algorithms based on these frame-intensity and scanning-motion data received by the computer 86 from the camera 64 and the scanner 84. Experiments have shown that the phase-shifting configuration of the invention produces a lateral shift in the fringe image. The resulting image displacement is quite small and can be compensated for in the analysis software.

Various changes in the details, steps and components that have been described may be made by those skilled in the art within the principles and scope of the invention herein illustrated and defined in the appended claims. For example, changing the tilt of the beam-splitter cube will also produce phase shift of the output beams. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

What is claimed is:

1. A lateral-shear interferometer for analyzing an incoming light wavefront of predetermined diameter, comprising:
   (a) a first beam-splitting plate with an outer front surface and an inner back surface; and
   (b) a second beam-splitting plate with an inner front surface and an outer back surface;
   wherein said first beam-splitting plate is positioned in an optical path of said wavefront at a predetermined internal angle of incidence; said inner back surface of the first beam-splitting plate and said inner front surface of the second beam-splitting plate define a wedge with a wedge angle that produces a lateral displacement of and interference between output wavefronts reflected therefrom; and said first and second beam-splitting plates have a thickness sufficient to avoid overlap of said output wavefronts with wavefronts reflected from said outer front surface and from said outer back surface.

2. The interferometer of claim 1, wherein said thickness of the first and second beam-splitting plates is at least equal to $D\sin\beta/\sin 2\beta$, where D is said diameter of the incoming light wavefront, and $\beta$ is said wedge angle.

3. The interferometer of claim 1, wherein said first and second beam-splitting plates are made of fuse-silica glass.

4. The interferometer of claim 3, wherein said thickness of the first and second beam-splitting plates is at least 9.5 mm.

5. The interferometer of claim 1, wherein said predetermined internal angle of incidence is approximately 45 degrees.

6. The interferometer of claim 1, wherein said wedge is an air gap less than 1 mm thick and said wedge angle is selected to provide about 3.5 interference fringes in an interference region of the output wavefronts.

7. The interferometer of claim 1, further comprising an aperture in the optical path of said incoming light wavefront, and a positive lens in an optical path of said output wavefronts.

8. The interferometer of claim 7, further comprising a negative lens in said optical path of the output wavefronts and a projection screen wherein said aperture is substantially in focus.

9. The interferometer of claim 7, further comprising a CCD array wherein said aperture is substantially focused in said optical path of the output wavefronts.

10. The interferometer of claim 9, further comprising a reflective surface in the optical path of said incoming light wavefront, wherein the reflective surface is disposed at a position defining an external angle of incidence of the incoming light wavefront; and comprising an angular scanner for varying said external angle of incidence to produce phase shifting in said output wavefronts.

11. The interferometer of claim 1, further comprising a beam-splitting cube in the optical path of said incoming light wavefront.

12. The interferometer of claim 1, further comprising an aperture in the optical path of said incoming light wavefront and a positive lens in an optical path of said output wavefronts; a CCD array wherein said aperture is substantially focused in said optical path of the output wavefronts; a reflective surface in the optical path of said incoming light wavefront, the reflective surface being disposed at a position defining an external angle of incidence of the incoming light wavefront; and an angular scanner for varying said external angle of incidence to produce phase shifting in said output wavefronts.

13. The interferometer of claim 12, further comprising means for recording intensity data corresponding to fringe patterns produced by said output wavefronts as a function of variations of said external angle produced by said angular scanner, and for performing phase shifting analysis on said data.

14. The interferometer of claim 13, wherein said first and second beam-splitting plates are made of glass and said thickness of the first and second beam-splitting plates is at least 9.5 mm.

15. The interferometer of claim 1, further comprising an aperture in the optical path of said incoming light wavefront and a positive lens in an optical path of said output wavefronts; and a negative lens in the optical path of the output wavefronts and a projection screen wherein said aperture is substantially in focus.

16. The interferometer of claim 15, wherein said first and second beam-splitting plates are made of glass and said thickness of the first and second beam-splitting plates is at least 9.5 mm.

17. A method of performing lateral-shear interferometry for analyzing an incoming light wavefront of predetermined diameter, comprising the following steps:

(a) providing a lateral-shear interferometer comprising a first beam-splitting plate with an outer front surface and an inner back surface, and a second beam-splitting plate with an inner front surface and an outer back surface, wherein said inner back surface of the first beam-splitting plate and said inner front surface of the second beam-splitting plate define a wedge with a wedge angle that produces a lateral displacement of and interference between output wavefronts reflected therefrom, and wherein said first and second beam-splitting plates have a thickness sufficient to avoid overlap of said output wavefronts with wavefronts reflected from said outer front surface and from said outer back surface;

(b) positioning said first beam-splitting plate in an optical path of said incoming light wavefront at a predetermined internal angle of incidence; and (c) observing fringe patterns produced by said interference between the output wavefronts.

18. The method of claim 17, further comprising the steps of providing a reflective surface in the optical path of said incoming light wavefront, wherein the reflective surface is disposed at a position defining an external angle of incidence of the incoming light wavefront; providing an angular scanner for varying said external angle of incidence to produce phase shifting in said output wavefronts; recording intensity data corresponding to fringe patterns produced by said output wavefronts as a function of variations of said external angle produced by said angular scanner; and performing phase shifting analysis on said data.

* * * * *